United States Patent [19]
Shirman et al.

[11] Patent Number: 5,357,600
[45] Date of Patent: Oct. 18, 1994

[54] METHOD AND APPARATUS FOR THE RENDERING OF CURVED SURFACES USING A CONE OF NORMALS

[75] Inventors: Leon A. Shirman, San Jose; Salim S. Abi-Ezzi, Foster City, both of Calif.

[73] Assignee: Sun Microsystems, Inc., Mountain View, Calif.

[21] Appl. No.: 961,252

[22] Filed: Oct. 15, 1992

[51] Int. Cl.⁵ ............................................. G06F 15/00
[52] U.S. Cl. .................................................. 395/133
[58] Field of Search ............... 395/119, 120, 123, 124, 395/125, 127, 133, 134, 138, 162; 345/121, 126

[56] References Cited

U.S. PATENT DOCUMENTS
4,752,828  6/1988  Chapuis et al. ..................... 358/183

OTHER PUBLICATIONS

Salim Abi-Ezzi: "The Graphical Processing of B-splines in a Highly Dynamic Environment," RPI Ph.D. dissertation, RDRC-TR-89001, Troy, New York (May 1989).

Salim Abi-Ezzi and Michael Wozny: "Factoring a Homogeneous Transformation for a more Efficient Graphics Pipeline", *Proc. Eurographics '90*, Montreux, Switzerland, pp. 245–255, Sep. 1990.

Salim Abi-Ezzi and Leon Shirman: "Tessellation of Curved Surfaces under Highly Varying Transformations", *Proc. Eurographics '91*, Vienna, Austria, pp. 385–397, Sep. 1991.

Gerald Farin: *Curves and Surfaces for Computer Aided Geometric Design: A Practical Guide*, Academic Press, 1988.

R. Farouki and V. Rajan: "Algorithms for Polynomials in Bernstein form," *Computer Aided Geometric Design*, 5(1988), pp. 1–26, 1988.

Daniel Philip, Robert Magedson, and Robert Markot: "Surface Algorithms Using Bounds on Derivatives," *Computer Aided Geometric Design*, 3(1986), pp. 295–311, 1986.

Jeffrey Lane, Loren Carpenter, Turner Whitted, and James Blinn: "Scan Line Methods for Displaying Parametrically Defined Surfaces," *Communications of the ACM*, 23(1), Jan. 1980.

Jeffrey Lane and Richard Riesenfeld: "A Theoretical Development for the Computer Generation and Display of Piecewise Polynomial Surfaces," *IEEE Transactions on Pattern Analysis and Machine Intelligence*, 2(1), pp. 35–46, Jan. 1980.

Sheue-Ling Lien, Michael Shantz, and Vaughan Pratt: "Adaptive Forward Differencing for Rendering Curves and Surfaces," *Computer Graphics*, 21(4), pp. 111–117, Jul. 1987.

W. Press, B. Flannery, S. Teukolsky, and W. Vetterling: *Numerical Recipes in C*, Cambridge University Press, New York, 1988.

Alyn Rockwood: "A Generalized Scanning Technique for Display of Parametrically Defined Surfaces," IEEE (List continued on next page.)

*Primary Examiner*—Phu K. Nguyen
*Attorney, Agent, or Firm*—Blakely Sokoloff Taylor & Zafman

[57] ABSTRACT

A system and method is provided to perform quick patch level tests in a timely manner. The normal function of the patch is first computed using the convex hull property of the patch. The control points, which indicate the direction of the normals of the normal function, are used to construct a floating cone. This cone contains all the normals to the given patch. The floating cone is then moved in space and is truncated by two parallel planes orthogonal to the cone axis to contain the original given patch. From this information, frontfacing and backfacing volumes are constructed. These volumes are then used to derive information about the patch that can speed up its processing. For example, culling may be performed on the patch level before tessellation into triangles. The time consuming operations of computing normals and the floating cone are performed at the creation time of the patch and are view independent. Therefore, for subsequent views of the same patch, the same cone of normals may be used to determine whether the patch is frontfacing or backfacing, providing substantial time savings in processing.

20 Claims, 7 Drawing Sheets

OTHER PUBLICATIONS

*Computer Graphics & Applications,* pp. 15–26, Aug. 1987.

G. Wang: "The Subdivision Method for Finding the Intersection Between Two Bezier Curves or Surfaces", Zhejiang University Journal, Special Issue on Computational Geometry (in Chinese), 1984.

Alyn Rockwood, Kurt Heaton, and Tom Davis: "Real-Time Rendering of Trimmed Surfaces," *Computer Graphics,* vol. 23, No. 3, pp. 107–116, Jul. 1989.

Alain Fournier and Delfin Y. Montuno, "Triangulating Simple Polygons and Equivalent Problems," *ACM Transactions on Graphics,* vol. 3, No. 2, pp. 153–174, Apr. 1984.

Michael R. Garey, David S. Johnson, Franco P. Preparata and Robert E. Tarjan, "Triangulating a Simple Polygon," *Information Processing Letters,* vol. 7, no. 4, Jun. 1978.

METHOD AND APPARATUS FOR THE RENDERING OF CURVED SURFACES USING A CONE OF NORMALS

BACKGROUND OF THE INVENTION

1. Field of the Invention

The present invention relates to the fast rendering of curved surfaces on a computer graphics display device. More particularly, the present invention relates to the quick patch level tests that speed up display of such surfaces. An example of these tests permits process of face culling on a patch level to eliminate backfacing patches before time consuming processing of the patches is performed.

2. Art Background

In the past, computer graphic systems required extensive display and computer resources. The amount of computation time required to render images was substantial. Images of any complexity required powerful computers to process hours in order to generate an image. Today the technology has greatly improved. The rendering of three-dimensional objects is no longer a process reserved for high-powered mainframe computers. The rendering of complex graphic objects is now realized on smaller, less powerful computers. Furthermore, graphics processes have become more sophisticated. In particular, the utilization of sophisticated graphics primitives is now prevalent. However, the usefulness of the sophisticated graphics primitives is measured in part by the speed at which the computer system can render the primitive on a display device. Although graphics hardware has greatly improved, techniques to circumvent time consuming processing is always desirable.

An example of a three dimensional object is a patch, such as a polynomial or rational patch. A patch is a three dimensional surface which may be a primitive by itself or part of a more sophisticated primitive such as a non-uniform rational B-spline surface (NURBS).

To display a surface primitive such as a patch, the surface primitive is reduced to or tessellated to triangles which are then individually processed, converted to pixel data for subsequent activation on the graphics display device. The process of tessellation of each patch is a fairly expensive operation. After the surface has been tessellated, each resulting triangle is passed to the pipeline. This is illustrated in FIG. 1. A triangle is first analyzed to determine whether it is located outside the modeling clipping region in Modeling Coordinates (MC), the view clipping region, or faces away from the viewer in World Coordinates (WC). If one of these tests is true, the triangle is rejected before performing lighting computations, clipping and rendering in Display Coordinates (DC). Similar pre-processing tests can be done on a surface patch as a whole using the convex hull property of the patch. For example, model clip and view clip tests can be accomplished by checking every control point of the patch. If the patch is not rejected, it is then tessellated and each triangle is processed by the triangle pipeline.

However, it is not apparent how to perform face culling on a patch level. The importance of back face rejections, at the primitive or the patch level has been recognized as key to increased, processing speed. The present invention provides this capability. In addition to face culling, the technique provides other information about the patch that can speed up processing even further. In particular, the technique allows to determine whether the patch is frontfacing, backfacing, has silhouette lines, as well as whether a given light source has any influence on the patch.

SUMMARY OF THE INVENTION

A system and method is provided to perform quick patch level tests in a timely manner. The normal function of the patch is first computed using the control points of the polynomial or rational patch in Bezier form. The vectors of the normal function are used to construct a floating cone by using the convex hull property of the patch. This cone contains all the normals to the given patch. The floating cone is then translated in space and is truncated by two parallel planes orthogonal to the cone axis to contain the given patch. From this information, frontfacing and backfacing volumes are constructed. These volumes are then used to derive information about the patch that can speed up its processing. For example, culling may be performed at the patch level before tessellation into triangles. The time consuming operations of computing the normal function and the floating cone are performed at the creation time of the patch and are view independent. Therefore, for subsequent views of the same patch, the same cone of normals may be used to determine whether the patch is frontfacing or backfacing, providing substantial time savings in processing.

BRIEF DESCRIPTION OF THE DRAWINGS

The objects, features and advantages of the present invention will be apparent to one skilled in the art in view of the following detailed description in which.

DETAILED DESCRIPTION OF THE INVENTION

A unique graphics pipeline and method is described for utilizing the same to preprocess curved patches in order to detect backfacing and frontfacing areas of patches to simplify and expedite the processing of patches. For example, patches backfacing relative to the eyepoint need not be processed, as the patches will not be visible on the display. Therefore, the patch is preprocessed to detect a backfacing patch such that the processing of backfacing patches is eliminated.

During preprocessing, a truncated cone of normals is constructed which contains all normals to the patch. Subsequently, a simple scalar product test determines whether the whole patch is backfacing or frontfacing so that the costly step of tessellating the patch is avoided in case of trivial rejection. This method and apparatus is further advantageous to flag the light sources that have no influence on the patch as well as the patches that have no silhouette lines. The process and system of the present invention will be described in the context of backface culling. However, it will be obvious to one skilled in the art that the invention is not limited to backface culling on a patch level, but rather is applicable to preprocessing of patches to determine whether certain time consuming and costly processes for each patch are required.

Figure 2:
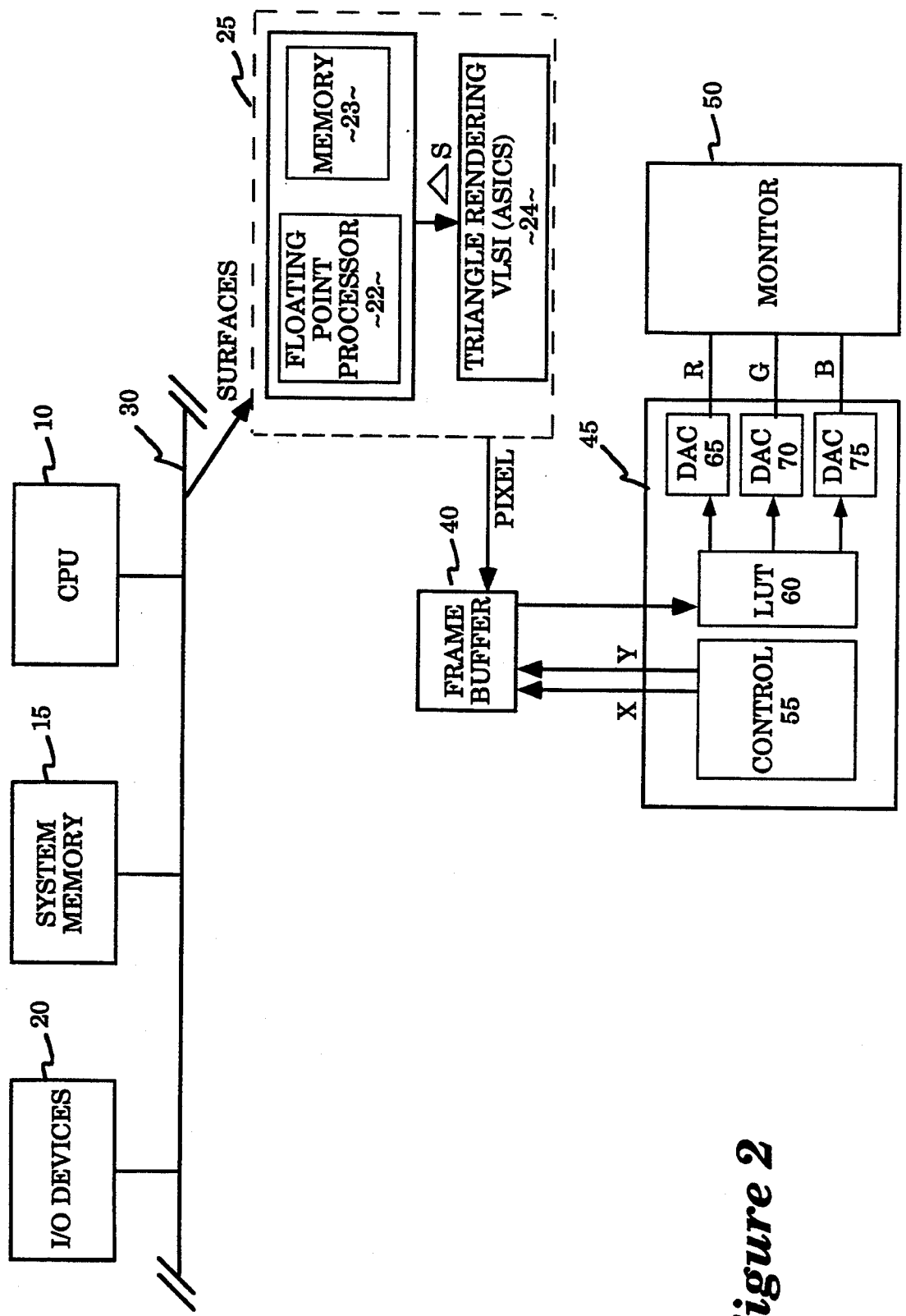
FIG. 2 is a block diagram of an embodiment of the system of the present invention.

The system of the present invention is conceptually illustrated by the block diagram of FIG. 2. A CPU 10, system memory 15, Input/Output (I/O) devices 20 and a display processor system 25 are coupled via a system bus 30. The CPU 10 functions as the central or host processor and typically executes application programs that generate the curved surfaces generated and display in accordance with the present invention. The CPU 10 functions as a powerful general purpose processor and utilizes the available resources such as the system memory 15, I/O devices 20 and other peripheral devices (not shown) to execute complex programs and processes. The CPU 10 may be configured into a system, for example, a computer workstation such as those manufactured by Sun Microsystems, Inc., Mountain View, Calif.

As will be more fully described subsequently, the display processor 25 system is specifically configured to execute simple, but highly repetitive and computation intensive processes required as part of the process for rendering primitives for formulating images. The system 25 consists of a floating point processing unit (FPU) 22, a memory 23 and at least one dedicated VLSI 24 or similar component that performs certain repetitive processes in a timely and cost effective manner. The display processor system 25 generates the pixel data representative of the visual representation of the primitives to be rendered and stores the pixel data in the frame buffer 40. The pixel data is stored in the frame buffer 40 in a sequence readily identified with the x-y coordinate space of the display device 50.

The display controller 45 generates the display of the primitive defined by the pixel data located in the frame buffer. The display controller 45 through its controller 55 cycles through the frame buffer, one scan line at a time in accordance with the raster scan rate, for example, 60 times a second. Memory addresses are generated by the controller 55 to access the pixel data. The pixel data is read from the frame buffer in sequence and input to the display controller color look-up table (LUT) 60. The LUT 60 contains the digital control signals used to control the intensity and color of the output, for example the beams, on the display device 50. The signals output by the LUT 60 are input to digital to analog converters (DACs) 65, 70 and 75 which generate the analog signals to control the energizing or generation of the location and intensity respectively of the red, green and blue components of the pixel to be displayed. The display device may be a raster scan device such as a cathode ray tube (CRT) or a hard copy device such as a plotter. For purposes of explanation, the display device will be a CRT; however, it is obvious to one skilled in the art that other display devices may be utilized in accordance with the system of the present invention.

In the method of the present invention, a cone of normals for a Bezier patch is generated. This cone of normals is used to perform face culling on a patch level as well as other processing regarding the patch that enables determinations to be made on a patch-level basis. Although the construction of the cone of normals is a relatively expensive process, it is view independent and need only take place once at a time of compilation of the patch. Thus, the actual tests performed for rendering each view of the patch are simple and fast, involving simply a scalar product computation.

Figure 1:
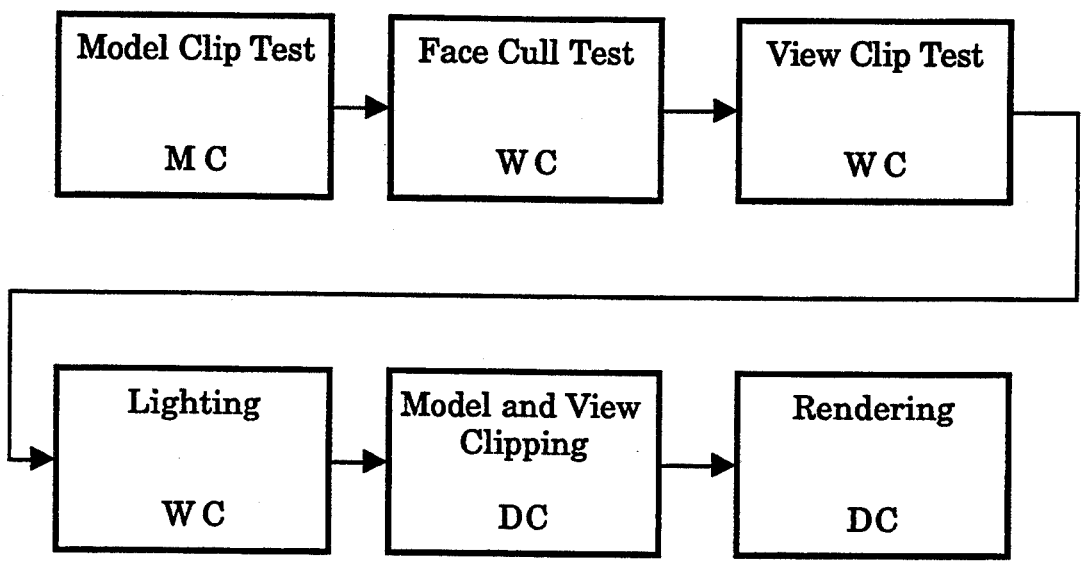
FIG. 1 is illustrative of a simplified triangle processing pipeline.
Figure 3:
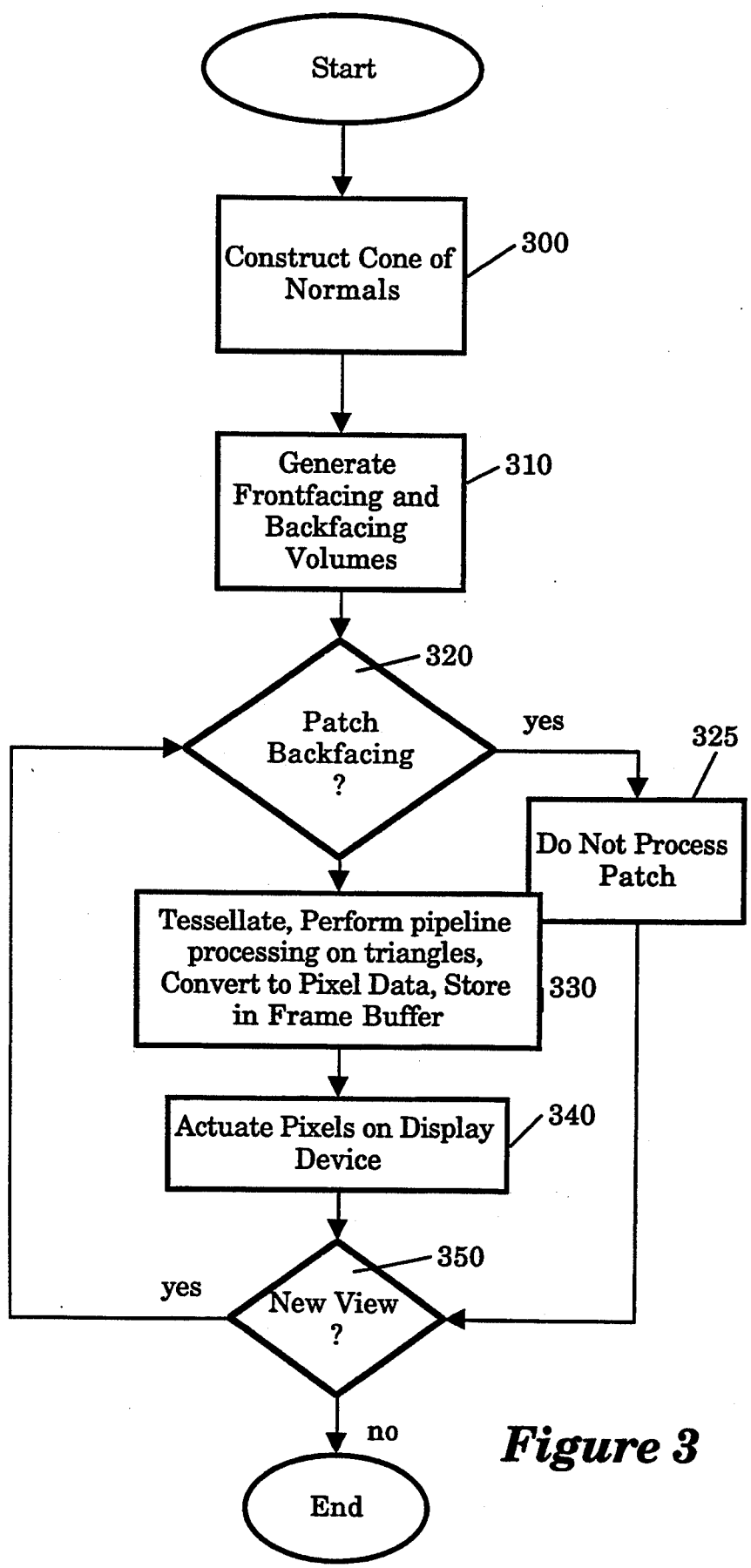
FIG. 3 is a flow diagram representing an embodiment of the process of the present invention.

The overall process to perform face culling using cone of normals is set forth in FIG. 3. At step 300, the cone of normals is constructed. Using the cone of normals, at step 310, the backfacing and frontfacing volumes are generated. This information, is utilized to determine, step 320, whether the patch currently being processed is backfacing. If it is backfacing, there is no need to perform additional processing of the patch as it will not be displayed on the display device and processing can immediately continue with respect to a next patch. If the patch is not backfacing, it may be visible, at least in part, on the display device and at step 330, the patch is processed by tessellation of the patch into triangles, passing the triangles through the pipeline (FIG. 1), conversion of the non-rejected triangles to pixel data and storage in the frame buffer. At step 340, the pixels identified by the pixel data are actuated on the display device to generate the display of the patch. If, at step 350, a new view is to be generated, the cone of normals processed at step 300 can be used to determine whether the patch is backfacing using a simple, fast scalar product. Thus, substantial time and processing overhead are saved by reusing the same cone of normals.

Figure 4:
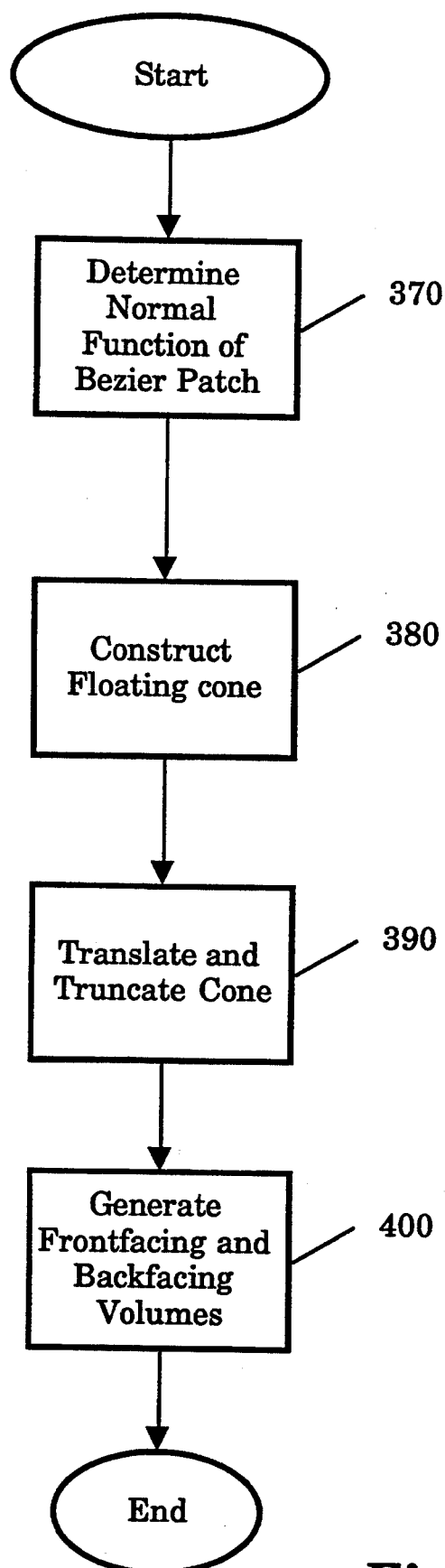
FIG. 4 is a flow diagram providing a more detailed representation of the process of the present invention.

The process is more specifically described with respect to FIG. 4. At step 370, the normal function of the Bezier patch is determined. The normal function $\vec{N}=[N_x, N_y, N_z]$ of the surface $S[x,y,z]$ is defined as cross-product between the tangent vectors in u and v, $S_u$ and $S_v$:

$$\vec{N} = \vec{S}_u \times \vec{S}_v = \begin{vmatrix} i & j & k \\ X_u & Y_u & Z_u \\ X_v & Y_v & Z_v \end{vmatrix}$$

In the rational case $S[x,y,z,w]$:

$$X_u = \frac{x_u w - x w_u}{w^2}, \quad Y_u = \frac{y_u w - y w_u}{w^2}, \quad Z_u = \frac{z_u w - z w_u}{w^2}$$

Therefore, expanding the above expression and ignoring denominators, since only direction of the normal is relevant for the determination of the cone, the following expressions for the direction of the scaled normal N' are determined:

$$\vec{N'}_x = (y_u z_v - z_u y_v)w + (yz_u - zy_u)w_v + (y_v z - z_v y)w_u,$$

$$\vec{N'}_y = (z_u x_v - x_u z_v)w + (zx_u - xz_u)w_v + (z_v x - x_v z)w_u,$$

$$\vec{N'}_z = (x_u y_v - y_u x_v)w + (xy_u - yx_u)w_v + (x_v y - y_v x)w_u.$$

It should be noted that in the non-rational case, $w=1$ and the partial derivatives of w are equal to zero; therefore the expressions for the direction of the normal are reduced to:

$$\vec{N'}_x = y_u z_v - z_u y_v$$

$$\vec{N'}_y = z_u x_v - x_u z_v \text{ and}$$

$$\vec{N'}_z = x_u y_v - y_u x_v$$

Furthermore, it will be realized that in the rational case, the (u, v) degrees of the normal function are $(3d_u-1, 3d_v-1)$, where $(d_u, d_v)$ are the degrees of the original patch. In the polynomial case, $w_u=w_v=0$, and multiplication by w is not necessary; therefore the degrees of the normal function are $(2d_u-1, 2d_v-1)$.

If the patch has a degeneracy caused by, for example, coincident control points of the patch, the cone of normals may alternatively be constructed using higher order derivatives to determine the normal directions.

Finding the normal function may be considered the most expensive operation in normal cone construction. However, as this determination is performed once for a given patch during compilation of the patch, the overall effect on processing performance is minimized.

Once the normal function has been computed, at step 380 the floating cone is constructed. The floating cone is constructed to contain all the normals to the patch to be rendered. In accordance with the convex hull property of a Bezier patch, all the points on a patch are contained in the convex hull of the control points of the normal Bezier patch. The normal function determined is itself a Bezier patch. Therefore, the normals to the original patch to be rendered are contained in the convex hull of the control vectors of the patch defined by the normal function. The number of control vectors is equal to the product of the u and v orders of the normal function.

Figure 5A:
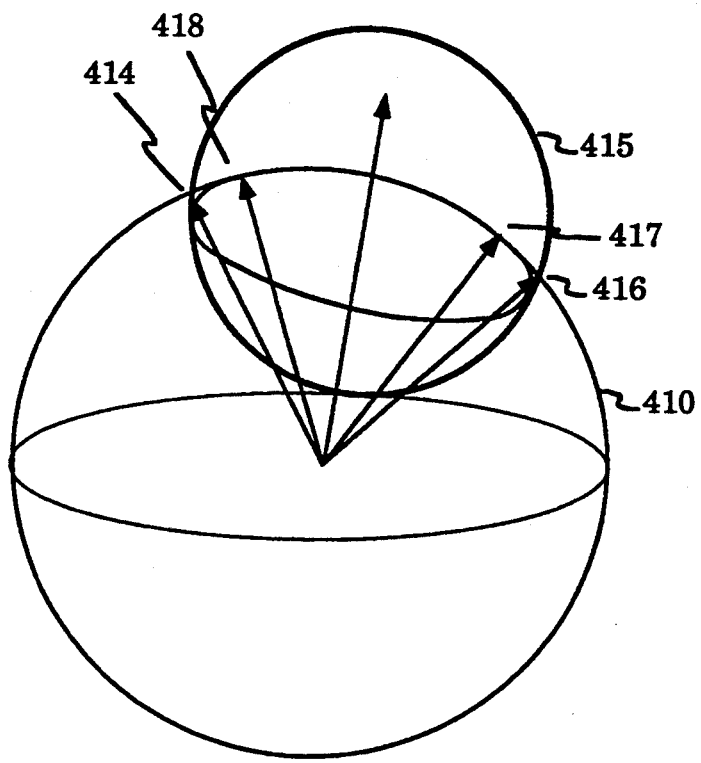
FIG. 5a and 5b illustrates the boundary box utilized to construct an enclosing sphere for the intersection points of the floating cone.

It is assumed that all the control vectors start from the origin. These vectors intersect the unit sphere, also centered at the origin, at points $N_i$, such as 414, 416, 417, 418. The smallest enclosing sphere 415 is therefore constructed to enclose intersection points 414, 416, 417, 418. The floating cone 419 is defined to pass through the intersection circle of the unit sphere 410 and the smallest enclosing sphere 415, as illustrated in FIG. 5a.

Figure 5B:
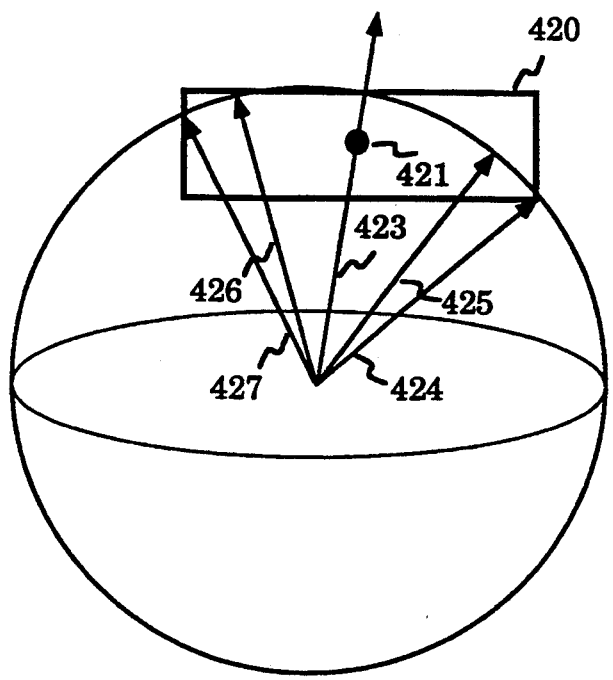

Finding the smallest enclosing sphere of a given set of points in space is a computational geometry problem. There are exact and iterative algorithms for its computation but they are rather slow. See, for example, C. Lawson, "The Smallest Covering Cone or Sphere", SIAM Reviews 7(3), pp. 415–417 (1965). To save processing overhead and time, a bounding box of intersection points is constructed. This method is very fast and produces a near-optimal solution. This is illustrated by FIG. 5b, wherein the bounding box 420 of all intersections defines the enclosing sphere. Referring to FIG. 5b, the floating cone itself is defined by the axis direction or vector $\vec{a}$ and a semiangle $\alpha$ (the angle between cone axis and its side). The cone axis passes through the origin and the center of the bounding box. The cone semiangle is defined by the largest angle between axis vector and normal vectors. This can be determined from the minimum scalar product of the normalized cone axis vector 423 and the normal patch control vectors $\bar{n}_i$, 424, 425, 426, 427.

$$\cos(\alpha) = \min_i (\vec{a}_i \cdot \vec{n}_i)$$

The cone axis passes through the origin and center C 421, where $$C_x = \frac{1}{2}\left(\max_i N_{ix} - \min_i N_{ix}\right),$$

$$C_y = \frac{1}{2}\left(\max_i N_{iy} - \min_i N_{iy}\right),$$

$$C_z = \frac{1}{2}\left(\max_i N_{iz} - \min_i N_{iz}\right).$$

Figure 6A:
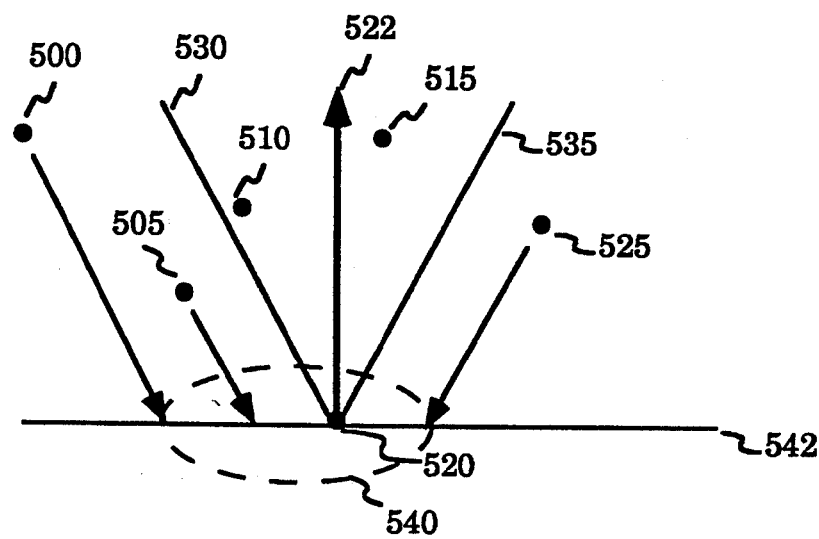
FIG. 6a and 6b illustrate the construction of a truncated cone.

The floating cone constructed contains all the patch normals. At step 390, a truncated cone anchored at a fixed position in space is generated containing the patch itself. It should be noted that, unlike the floating cone, the truncated cone has a fixed position in space. Referring to FIG. 6a, to construct the truncated cone, the "bottom" control point 520 with respect to the cone axis vector 522 is first found by selecting the smallest dot product of the cone vector and each of the vectors originating from the origin to each of the patch control points. A bottom plane 542 is defined to pass through the bottom point 520 orthogonal to the cone axis 522. The apex of the floating cone is translated (in a manner parallel to the cone axis) to be located at the bottom point 520.

Each control point $P_i$ above the bottom plane is then checked to determine if it is enclosed by the moved floating cone. If it is not enclosed by the floating cone, this point is projected onto the bottom plane. The direction of projection is parallel to the nearest cone side and takes place in the plane formed by the cone axis and the projected point. This is illustrated by FIG. 6a, wherein points 500, 505 and 525 are projected on the bottom plane 542 as the points are outside the cone defined by the apex 520 and sides 530 and 535. The projected point $P'_i$ can be computed as follows:

$$\vec{BP'_i} = r(\vec{BP_i} - \vec{ha}),$$
$$h = \vec{BP_i} \cdot \vec{a},$$

$$r = \frac{\sqrt{\|\vec{BP_i}\|^2 - h^2} - h\tan(\alpha)}{\sqrt{\|\vec{BP_i}\|^2 - h^2}}$$

where h is the height of $P_i$ above the bottom plane $\vec{a}$ is the normalized cone axis vector, $\alpha$ is the cone semiangle, r is the ratio of the distances to the cone axis from $P'_i$ and $P_i$, and B is the bottom point.

After this operation has been performed for all control points, the smallest circle 540 that enclosed all the points projected onto the bottom plane is calculated. Preferably fast algorithms capable of computing the smallest enclosing circle in near-linear time using linear programming techniques are utilized in this process. See, for example, Franco Preparata, Michael Shamos, *Computational Geometry: An Introduction*, (Springer-Verlag 1985). However, the bounding box approach also works well in the planar case and efficiently produces a near-optimal circle.

Figure 6B:
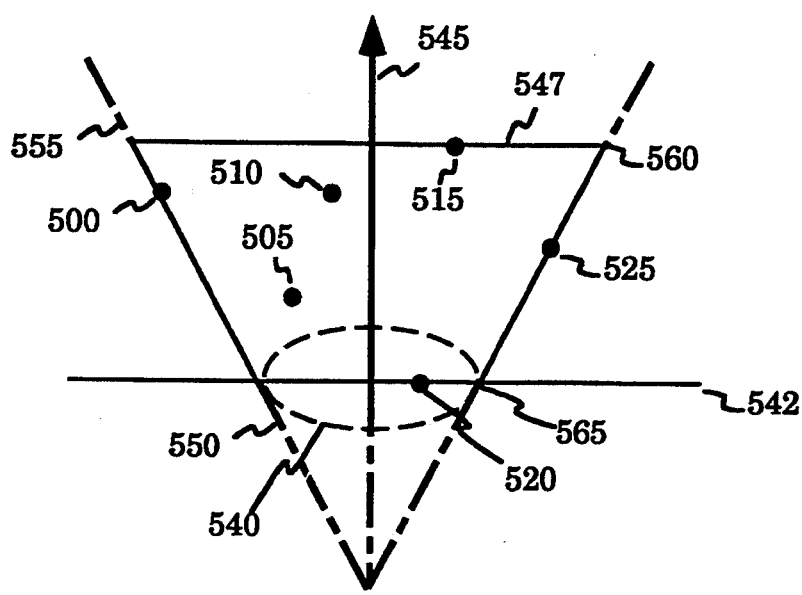

The cone is then translated (parallel to its axis) 545 so that the circle 540 lies on the surface of the cone and delineates bottom truncating plane 542. Finally, the top truncating plane 547 is determined according to the top most control point 515. The top truncating plane is determined by selecting the largest scalar product of the cone vector and vectors from the origin to the patch control points. As illustrated in FIG. 6b, the cone is moved in a downward direction such that the circle 540 lies on the surface of the cone and the top truncating plane is identified by the position of topmost control point 515, resulting in truncated cone defined by points 550, 555, 560, 565.

Figure 7:
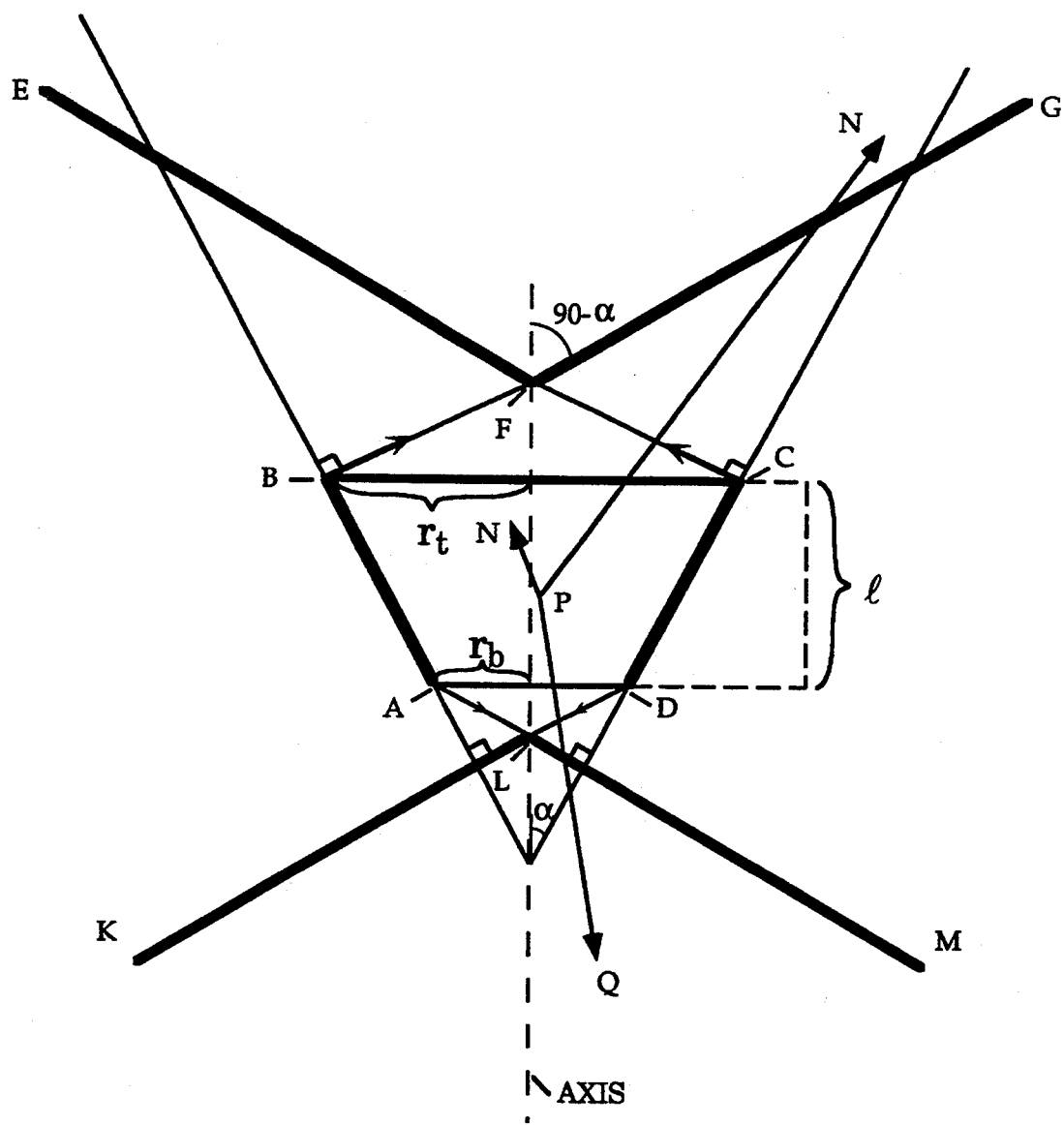
FIG. 7 is a cross section of a cone illustrating frontfacing and backfacing areas.

Once the cone is truncated, the space around the patch can be partitioned to determine the frontfacing and backfacing volumes. FIG. 7 shows the cross-section of the cone through its axis. The area ABCD contains all the control points of the patch. The frontfacing and backfacing areas are constructed by drawing perpendiculars $\overline{BG}$, $\overline{CE}$, $\overline{AM}$, and $\overline{DK}$ through the cone sides.

The frontfacing and backfacing areas are actually full cones with apexes at F and L respectively. These apexes lie on the axis of the truncated cone. The semiangles of the frontfacing and backfacing cones are equal to $$\frac{\pi}{2} - \alpha$$

where $\alpha$ is the truncated cone semiangle. The distance from the bottom plane to L is equal to $r_b \tan(\alpha)$, where $r_b$ is the radius of the bottom circle representative of the bottom plane of the cone (540, FIG. 6a). Analogously, the distance from the top plane of the cone, shown as $\overline{BC}$, to F is equal to $r_t \tan(\alpha)$, where $r_t$ is the radius of the top circle of the truncated cone and is equal to:

$$r_t = r_b + l*\tan(\alpha),$$

where l is length of truncated cone.

For any point P and any normal $\vec{n}$ in the truncated cone, it is straightforward to verify the following relationships:

For any point N in the frontfacing area EFG, the angle between $\overline{PN}$ and $\vec{n}$ is less than 90°.

For any point Q in the backfacing area KLM, the angle between $\overline{PQ}$ and $\vec{n}$ is greater than 90°.

For a point S which lies neither in the frontfacing nor in the backfacing areas, the angle between $\overline{PS}$ and $\vec{n}$ can range from 0° to 180°.

Preferably, all the construction steps described above take place in MC space at primitive creation or compilation time during which view independent information regarding the primitive is generated. At traversal time, during which the primitive is tessellated and the pixel data are generated, a simple scalar cone inclusion test can be used to determine various facts regarding the current patch position in space which can be utilized to speed up processing.

Continuing with the present example of face culling, it is assumed that backfacing patches are culled. However, the case of culling frontfacing patches may be treated analogously. Furthermore, the frontfacing and backfacing volumes of the cone can be utilized to determine whether certain processes are to be performed with respect to lighting the patch due to certain light sources or processing silhouette edges. Therefore, using a simple scalar inclusion test, the following can be determined:

If the eye point (viewing vector) is inside the backfacing volume, the angle between any of the patch normals and the vector from any patch point to the eye point is greater than 90°. Therefore, the whole patch is trivially rejected. Very significant time and overhead savings are realized if this is the case, because there is no need to process this patch further (i.e. tessellation of the patch and the determination whether the resulting triangles are backfacing).

Analogously, if the eye point (viewing vector) is inside the frontfacing volume, the whole patch is trivially accepted. In this case, the face culling tests typically performed with respect to each of the triangles resulting from the tessellation of the patch are not required, thereby saving a substantial amount of time.

If a light source position or vector is inside the backfacing volume, this light source has no influence on the patch (assuming surface backside need not be lighted). Therefore, the light can be "turned off", i.e. eliminated from the processing pipeline, which results in, savings of time required to perform lighting computations for each tessellated triangle of the patch.

If the eye point (viewing vector) is in the frontfacing or in the backfacing volume, the patch has no silhouette edges, because the angle between a patch normal and the vector to the eye point will either be less or greater, but never equal to 90°. Proper processing of silhouette edges is an expensive operation, because all three normals of each triangle need to be checked to determine whether they are front or backfacing. Flagging those triangles for which this operation is not necessary saves a significant amount of processing time.

The cone inclusion test itself is a simple scalar product test. The test makes sure that the angle between the cone axis vector $\vec{a}$ and the current vector $\vec{d}$ from the cone apex of the backfacing or frontfacing volume to the current view point is less than the cone semiangle. This can be done by ensuring that the scalar product (e.g. dot product) of the above normalized directions is larger than the cosine of the front or backfacing cone semiangle (which is equal to the sine of the truncated cone semiangle). Therefore to determine if the direction is inside the frontfacing volume of the cone, the scalar product $\vec{a} \cdot \vec{d}$, is compared to $\sin(\alpha)$ where $\alpha$ is the truncated cone semiangle:

$$a \cdot d \geq \cos\left(\frac{\pi}{2} - \alpha\right) = \sin(\alpha)$$

If $\vec{a} \cdot \vec{d}$ is greater than $\sin(\alpha)$, the vector is inside the frontfacing volume of the cone. Similarly, if $-\vec{a} \cdot \vec{d}$ is greater than $\sin(\alpha)$, the vector is inside the backfacing volume of the cone.

It follows that similar scalar product tests can be performed to determine whether other vectors are within the frontfacing or backfacing volumes. For example, to determine if a light source vector ls is within a backfacing volume, therefore having a no lighting effect on the patch, a simple scalar product, $-\vec{a} \cdot ls$ is compared to $\sin(\alpha)$. If the product $-\vec{a} \cdot ls$ is greater than $\sin(\alpha)$, the light source vector is within the backfacing volume and thus has a no lighting effect on the patch.

The steps performed to construct the cone typically take place in MC space. The determination of backfacing rejection of patches takes place in Lighting Coordinate (LC) or World Coordinates (WC) space. If the cone construction was to be performed in WC space, this would make the relatively expensive construction process dependent on the modeling transformation. However, if the modeling transformation is isotropic, all computations can be done in MC space by transforming the eye point (viewing direction) from WC to MC. Isotropic transforms are combinations of uniform scaling, rotation, and translation and preserve aspect ratios and angles. In mathematical terms, the transform M is isotropic, if $M^TM=\lambda I$, where $\lambda$ is some constant and I the identity matrix.

Assuming that M is isotropic, each time the modeling or viewing transform changes, the eye position (viewing vector) and light positions (vectors) are transformed from World to Model Coordinates where the tests take place. However, a non-isotropic transformation may distort angles between cone axis and viewing vectors. Therefore, the tests for determining the inclusion of frontfacing and backfacing areas have to be performed in WC space instead of MC space. This situation is analogous to lighting calculations—if the modeling transform is isotropic, the processing can be done in MC space, otherwise the processing is performed in WC space.

In this case it is possible to transform the control directions of the normal Bezier patch to WC, and do the remaining construction steps in WC space. The most computationally expensive operation—finding the normal function—can still be done once at primitive creation time. The remaining steps depend upon the modeling, but not viewing, transformation. If the viewing transformation changes often, the construction of the normal cone will not have to be regenerated frequently. Other approaches to accommodate non-isotropic transformations may also be used.

The advantages of the present system are realized in tests performed on patches. Tests on typical patches have shown that typically, 20% to 45% of all Bezier patches were trivially rejected. The 20% rate was characteristic of cylindrical surfaces represented with four Bezier patches, so that the floating cone semiangle was 45°. Models with a large number of flat surfaces had rejection rates approaching 50%. On the average, about 30% of Bezier patches were trivially rejected. About the same amount of patches was trivially accepted. The 30% rejection rate indicates a 30% increase in speed due to the fact that the rejected patches need not be processed further. In addition, trivially accepted patches (also 30% on the average) can be processed faster, because there is no need to perform face culling tests on the triangle level.

Finally, highly curved patches (with large floating cone semiangles) are rejected very rarely, if at all. However, high patch curvature can be detected at compilation and these patches can be subdivided until the semiangles of the corresponding floating cones are sufficiently small to utilize the process described herein for performing face culling.

The cone of normals technique of the present invention has been discussed with respect to the processing of Bezier patches. However, the method can be used for other surface primitives, such as triangular strips and quadrilateral meshes. These primitives are represented by a joined set of triangular or quadrilateral facets having vertex normals and facet normals.

Since facet normals are used for backface rejection, and vertex normals for lighting, both facet and vertex normals should be used in the construction of the normal cone. These normal vectors are used to construct the floating cone as described in step 380. The other steps of building the truncated cone and the frontfacing and the backfacing volumes are also identical to those for curved patches. However, there is no need to compute the normal function as the normals are provided as part of the primitive.

The cone of normals system and process discussed herein enables the performance of face culling of Bezier patches prior to tessellation of the patch into triangles. For each patch, a sequence of view independent construction steps, that are performed once during creation of the primitive, build frontfacing and backfacing areas. During traversal, a fast scalar product is used to determine the orientation of the patch with respect to an eyepoint. The advantages are readily realized in applications with frequently changing modeling and viewing transformations. In addition to trivially rejecting and accepting whole Bezier patches, the technique also provides ways to increase the speed of lighting calculations and check for the absence of silhouette edges. Furthermore, the method can also be used for other surface primitives, such as triangular strips and quadrilateral meshes. In addition, the cone of normals technique may be used in a processor system which performs the dynamic tessellation of surfaces (See, Salim Abi-Ezzi and Leon A. Shirman, "Tessellation of Curved Surfaces Under Highly Varying Transformations," Proceedings, Eurographics'91, Vienna, Austria, p. 385–397, September 1991). In this approach, high performance is achieved by the compilation of graphics primitives at creation time into forms that can be processed very quickly during traversal. In this system, the construction of the cone of normals becomes a part of the compilation of a Bezier patch.

While the invention has been described in conjunction with the preferred embodiment, it is evident that numerous alternatives, modifications, variations and uses will be apparent to those skilled in the art in light of the foregoing description.

We claim:

1. In a computer system comprising a central processing unit (CPU), memory and input/output devices including a graphic display controller coupled to a graphic display device, a method for rendering graphic primitives comprising curved surfaces as graphic images on the graphic display device, said primitives defined in a Model Coordinate (MC) space according to control points, transformed to World Coordinate (WC) space and rendered as images in Device Coordinate (DC) space, said graphic display device defined according to the DC space, said method comprising the steps of:

determining a set of normal vectors to the curved surface to be rendered;

constructing a floating cone comprising the set of normal vectors;

generating from the floating cone, a truncated cone anchored at a predetermined location, containing the patch normal vectors and patch control points;

constructing a frontfacing volume and a backfacing volume from the truncated cone;

performing frontfacing/backfacing tests to determine whether elements relative to the curved surface are within the frontfacing or backfacing volumes;

determining the processing elements of the processing pipeline to be executed from whether the elements relative to the curved surface are within the frontfacing or backfacing volumes;

generating pixel data by executing the processing components of the processing pipeline determined, each pixel data specifying the intensity of the pixel to be displayed on the graphic display device;

storing each pixel data in a frame buffer, each pixel data being stored at a location in the frame buffer corresponding to the location of the pixel in the device coordinate space;

said graphic display controller reading the pixel data stored in the frame buffer and generating control signals to actuated the pixel at the location and intensity indicated by the pixel data.

2. The method as set forth in claim 1, wherein said step of constructing a floating cone comprises the steps of:

identifying the apex of the floating cone to be located at an origin;

constructing a unit sphere centered about the origin, said normal vectors intersecting the unit sphere;

constructing a smallest enclosing sphere which encloses the intersection points of the unit sphere and the normal vectors; and constructing the floating cone to pass through a circle which intersects the unit sphere and the smallest enclosing sphere, said floating cone having a semiangle $\alpha$.

3. The method as set forth in claim 2, wherein the smallest enclosing sphere is constructed using a bounding box to define the enclosing sphere.

4. The method as set forth in claim 1, wherein said step of generating the truncated cone comprises the steps of:

defining a bottom plane to be a plane orthogonal to the cone axis and passing through the bottom most control point of the patch;

translating the apex of the floating cone parallel to the cone axis to be located and anchored at the bottom-most control point;

projecting the control points above the bottom plane onto the bottom plane if the control point is not enclosed by the moved floating cone;

generating the smallest circle that encloses all points projected onto the bottom plane;

translating the cone parallel to its axis such that the smallest circle lies on the surface of the cone and delineates the bottom truncating plane; and generating the top truncating plane by generating a plane orthogonal to the cone axis which intersects the top-most control point of the patch.

5. The method as set forth in claim 1, wherein the step of constructing the frontfacing and backfacing volumes comprises the steps of:

generating the frontfacing volume as a cone having a semiangle equal to $\pi/2 - \alpha$, where $\alpha$ is a semiangle of the floating cone, and an apex colinear with the apex of the truncated cone at a distance below the bottom truncating plane equal to $r_b \tan(\alpha)$ where $r_b$ is the radius of the circle formed by the bottom truncating plane through the cone; and generating the backfacing volume as a cone having a semiangle equal to $\pi/2 - \alpha$, and an apex colinear with apex of the truncated cone at a distance above the top plane equal to $r_t \tan(\alpha)$ where $r_t$ is the radius of a circle formed by the top plane through the cone, $r_t$ being equal to $r_b + l*\tan(\alpha)$, where $l$ is the length of the truncated cone defined as the distance between the top plane and bottom plane.

6. The method as set forth in claim 1, wherein face culling of non-visible surfaces is performed by comparing the scalar product $\bar{a} \cdot \bar{d}$ to the quantity $\sin(\alpha)$, where $\alpha$ is a semiangle of the floating cone, said value $\bar{a}$ representative of the cone axis vector and $\bar{d}$ is representative of the vector of a viewpoint to be displayed, such that if the scalar product is less than the quantity $\sin(\alpha)$, the vector of the patch with respect to the viewpoint is backfacing as it is not within the frontfacing volume and the pipeline of processing components are bypassed as the patch is not displayed.

7. The method as set forth in claim 1, wherein the scalar product of $\bar{a} \cdot \bar{d}$ is compared to the quantity $\sin(\alpha)$, where $\alpha$ is a semiangle of the floating cone, said value $\bar{a}$ representative of the cone axis vector and $\bar{d}$ is representative of the vector of a viewpoint to be displayed, such that if the scalar product is greater than the quantity $\sin(\alpha)$, the vector of the patch with respect to the viewpoint is within the frontfacing volume and pipeline components which perform face culling are bypassed as the curved surface and the resulting triangles are within the frontfacing volume and are displayed.

8. The method as set forth in claim 1 wherein $\bar{a}$ represents the cone axis vector, the graphic primitive is further defined as having a light source having a light source vector $\bar{ls}$, and the scalar product $\bar{a} \cdot \bar{ls}$ is compared to the quantity $\sin(\alpha)$ where $\alpha$ is a semiangle of the floating cone, such that if the product is greater than the quantity $\sin(\alpha)$, the light source direction $ls$ is within the frontfacing volume and the pipeline components which perform lighting computations are enabled to process the effect of the light source on the curved surface.

9. The method as set forth in claim 1 wherein a first scalar product $\bar{a} \cdot \bar{d}$ and a second scalar product $-\bar{a} \cdot \bar{d}$ are compared to the quantity $\sin(\alpha)$, where $\alpha$ is a semiangle of the floating cone, said value $\bar{a}$ representative of the cone axis vector and $\bar{d}$ is representative of the vector of a viewpoint to be displayed, such that if the first scalar product or the second scalar product is greater than the quantity $\sin(\alpha)$, the curved surface is within the frontfacing volume or backfacing volume and the pipeline components which process silhouette edges are bypassed.

10. The method as set forth in claim 1 wherein said curved surface comprises at least one Bezier patch, each of said patches being compared with the frontfacing or backfacing areas, such that the frontfacing/backfacing tests are performed on each patch.

11. The method as set forth in claim 1, wherein said step of generating pixel data comprises the steps of:

tessellating the frontfacing elements of the curved surface into polygons;

lighting the polygons in accordance with light sources defined for the graphic image to be rendered; and generating the pixel data for each polygon.

12. In a computer system comprising a central processing unit (CPU), memory and input/output devices including a graphic display controller coupled to a graphic display device, an apparatus for rendering graphic primitives comprising curved surfaces as graphic images on the graphic display device, said primitives defined in a Model Coordinate (MC) space according to control points, transformed to World Coordinate (WC) space and rendered as images in Device Coordinate (DC) space, said graphic display device defined according to the DC space, said apparatus comprising:

means for determining a set of normal vectors to the curved surface to be rendered;

means for constructing a floating cone comprising the set of normal vectors;

means for generating from the floating cone, a truncated cone anchored at a predetermined location in space and containing the curved surface normal vectors and control points;

means for constructing a frontfacing volume and a backfacing volume from the truncated cone;

test means for determining whether elements relative to the curved surface are within the frontfacing and backfacing volumes;

a graphics pipeline for processing curved surfaces comprising processing components for generating pixel data representative of the elements of the curved surface, each pixel data specifying the intensity of the pixel to be displayed on the graphic display device;

selection means for causing certain processing components not to execute during processing of the curved surface, said selection means identifying the processing components not to execute according to the test means determining whether elements are within the frontfacing or backfacing volumes;

a frame buffer for the storage of each pixel data, wherein memory locations of the frame buffer correspond to locations in DC space;

scan conversion means for generating pixel data representative of each polygon and storing the pixel data in the frame buffer, each pixel data specifying the intensity of the pixel to be displayed on the graphic display device;

wherein pixel data is generated in a timely and cost effective manner.

13. The apparatus as set forth in claim 12, wherein, said curved surface comprises at least one Bezier patch, said pipeline comprising a processing component which tessellates a patch into a plurality of triangles, a component which performs face culling for each triangle, and at least one component which generates pixel data for each triangle, said test means compares the scalar product $\vec{a} \cdot \vec{d}$ to the quantity $\sin(\alpha)$, where $\alpha$ is a semiangle of the floating cone, said value $\vec{a}$ representative of the cone axis vector and $\vec{d}$ is representative of the vector of a viewpoint to be displayed, such that if the scalar product is less than the quantity $\sin(\alpha)$, the vector of the patch with respect to the viewpoint is backfacing as the vector is not within the frontfacing volume, and said selection means causing the processing components which performs face culling for each triangle and which generates the pixel data for each triangle to be bypassed.

14. The apparatus as set forth in claim 12, wherein, said curved surface comprises at least one Bezier patch, said pipeline comprising a processing component which tessellates a patch into a plurality of triangles and a component which performs face culling for each triangle, said test means compares the scalar product $-\vec{a} \cdot \vec{d}$ to the quantity $\sin(\alpha)$, where $\alpha$ is a semiangle of the floating cone, said value $\vec{a}$ is representative of the cone axis vector and $\vec{d}$ is representative of the vector of a viewpoint to be displayed, such that if the scalar product is greater than the quantity $\sin(\alpha)$, the vector of the patch with respect to the viewpoint is within the frontfacing volume, and said selection means causes the processing component which performs face culling for each triangle to be bypassed as all triangles are frontfacing and are processed.

15. The apparatus as set forth in claim 12, wherein, said curved surface comprises at least one Bezier patch, said pipeline comprising at least one processing component which performs lighting computations with respect to a light source, said test means compares the scalar product $\vec{a} \cdot \vec{ls}$ to the quantity $\sin(\alpha)$, where $\alpha$ is a semi angle of the floating cone, said value $\vec{a}$ representative of the cone axis vector and $\vec{ls}$ is representative of the vector of a light source, such that if the scalar product is greater than the quantity $\sin(\alpha)$, the vector of the patch with respect to the light source is within the frontfacing volume, and said selection means causes the processing component which performs lighting computations to execute.

16. The apparatus as set forth in claim 12, wherein, said curved surface comprises at least one Bezier patch, said pipeline comprising a processing component which processes silhouette edges, said test means compares a first scalar product $\vec{a} \cdot \vec{d}$ and second scalar product $-\vec{a} \cdot \vec{d}$ to the quantity $\sin(\alpha)$, where $\alpha$ is a semiangle of the floating cone, said value is $\vec{a}$ representative of the cone axis vector and $\vec{d}$ is representative of the vector of a viewpoint to be displayed, such that if the first scalar product or second scalar product is greater than the quantity $\sin(\alpha)$, the vector of the patch with respect to the viewpoint is within the frontfacing volume or within the backfacing volume, and said selection means causes the processing component which processes silhouette edges to be bypassed as no silhouette edges occur.

17. The apparatus as set forth in claim 12, wherein said means for constructing a floating cone;

identifies the apex of the floating cone to be located at an origin;

constructs a unit sphere centered about the origin, said normal vectors intersecting the unit sphere;

constructs a smallest enclosing sphere which encloses the intersection points of the unit sphere and the normal vectors; and constructs the floating cone to pass through a circle which intersects the unit sphere and the smallest enclosing sphere, said floating cone having a semiangle $\alpha$.

18. The apparatus as set forth in claim 12, wherein said means for generating the truncated cone;

defines a bottom plane to be a plane orthogonal to the cone axis and passing through the bottom most control point of the patch;

translates the apex of the floating cone parallel to the cone axis to be located and anchored at the bottommost control point;

projects the control points above the bottom plane onto the bottom plane if the control point is not enclosed by the moved floating cone;

generates the smallest circle that encloses all points projected onto the plane;

translates the cone parallel to its axis such that the smallest circle lies on the surface of the cone and delineates the bottom truncating plane; and generates the top truncating plane by generating a plane orthogonal to the cone axis which intersects the top-most control point of the patch.

19. The apparatus as set forth in claim 12, wherein means for constructing the frontfacing and backfacing areas;

generates the frontfacing area as a cone having a semiangle equal to $\pi/2 - \alpha$, where $\alpha$ is a semiangle of the floating cone, and an apex colinear with the apex of the truncated cone at a distance below the bottom truncating plane equal to $r_b \tan(\alpha)$, where $r_b$ is the radius of the circle formed by the bottom plane through the cone;

generates the backfacing area as a cone having a semiangle equal to $\pi/2 - \alpha$, and an apex colinear with apex of the truncate cone at a distance above the top plane equal to $r_t \tan(\alpha)$, where $r_t$ is the radius of a circle formed by the top plane through the cone, $r_t$ being equal to $r_b + l*\tan(\alpha)$, where l is the length of the truncated cone defined as the distance between the top plane and bottom plane.

20. A computer system for the tessellation of graphic primitives comprising curved surfaces for rendering the graphic primitives comprising curved surfaces as graphic images on a graphics display device, said primitives defined in a Model Coordinate (MC) space according to control points, transformed to World Coordinate (WC) space and rendered as images in Device Coordinate (DC) space, said graphic display device defined according to the DC space, said system comprising:

a host processor, said host processor, determining a set of normal vectors to the curved surface to be rendered, constructing a floating cone comprising the set of normal vectors, generating from the floating cone, a truncated cone anchored at a predetermined location in space, containing the patch normal vectors and patch control points;

constructing a frontfacing volume and a backfacing volume from the truncated cone, and identifying elements of the curved surface which are within the frontfacing and backfacing volumes;

a graphics processing subsystem coupled to the host processor, said subsystem, comprising a pipeline of graphic processing components which generate pixel data, said subsystem determining the processing components of the graphic processing pipeline to be executed from whether the elements relative to the curved surface are within the frontfacing and backfacing volumes, and generating pixel data by executing the graphic processing components of the pipeline determined, each pixel data indicating the color and intensity of the pixel to be generated on the display device;

a frame buffer coupled to the graphics processing subsystem for storing the pixel data, the memory locations of the frame buffer corresponding to locations in DC space and the display device; and a graphics display controller coupled to the frame buffer and the display device for reading pixel data stored in the frame buffer and generating control signal to actuate the pixels on the display device at the location and intensity indicated by the pixel data;

wherein pixel data is generated and displayed in a timely and cost effective manner.

* * * * *

UNITED STATES PATENT AND TRADEMARK OFFICE
CERTIFICATE OF CORRECTION

PATENT NO. : 5,357,600
DATED : October 18, 1994
INVENTOR(S) : Shirman et al.

It is certified that error appears in the above-identified patent and that said Letters Patent is hereby corrected as shown below:

In column 12, claim 8 at lines 26 (both occurrences) and 29, please delete " ls " and insert -- $\vec{ls}$ --.

In column 14, claim 15 at lines 14 and 17, please delete " ls " and insert -- $\vec{ls}$ --.

In column 14, claim 15 at line 16, please delete " representative " and insert -- is representative --.

Signed and Sealed this

Twenty-ninth Day of September, 1998

Attest:

BRUCE LEHMAN

*Attesting Officer*          *Commissioner of Patents and Trademarks*